United States Patent
Chandrasekaran et al.

(10) Patent No.: US 10,257,346 B2
(45) Date of Patent: *Apr. 9, 2019

(54) SUPPRESSING INDICATIONS OF INCOMING COMMUNICATIONS IN USER INTERFACES

(71) Applicant: Microsoft Technology Licensing, LLC, Redmond, WA (US)

(72) Inventors: Vijay Chandrasekaran, Sunnyvale, CA (US); Ats Jenk, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,153

(22) Filed: Aug. 31, 2018

(65) Prior Publication Data
US 2018/0375990 A1 Dec. 27, 2018

Related U.S. Application Data

(63) Continuation of application No. 15/097,488, filed on Apr. 13, 2016, now Pat. No. 10,075,583.

(51) Int. Cl.
*H04M 3/42* (2006.01)
*H04M 1/725* (2006.01)
*H04L 12/58* (2006.01)

(52) U.S. Cl.
CPC ........ *H04M 1/72597* (2013.01); *H04L 51/24* (2013.01); *H04L 51/26* (2013.01); *H04L 51/14* (2013.01)

(58) Field of Classification Search
CPC .............................. H04M 1/72597

USPC ...................................................... 455/414.1
See application file for complete search history.

(56) References Cited

U.S. PATENT DOCUMENTS

| | | | |
|---|---|---|---|
| 8,615,221 B1* | 12/2013 | Cosenza ................. | H04M 3/42 455/414.1 |
| 8,751,509 B1* | 6/2014 | Abercrombie, III ... | G06Q 30/02 707/613 |
| 9,325,755 B1* | 4/2016 | Abercrombie, III ........................ | H04L 65/403 |
| 2004/0002972 A1* | 1/2004 | Pather ..................... | G06F 9/542 |
| 2006/0150175 A1* | 7/2006 | Etelapera ................. | G06F 8/65 717/168 |
| 2006/0166651 A1* | 7/2006 | Kim ........................ | H04L 51/24 455/412.1 |
| 2010/0107088 A1* | 4/2010 | Hunt ....................... | G06Q 10/10 715/752 |
| 2014/0172140 A1* | 6/2014 | Buck ....................... | H04L 67/10 700/94 |
| 2016/0260296 A1* | 9/2016 | Shirriff ................... | G08B 5/22 |
| 2016/0308940 A1* | 10/2016 | Procopio ............ | G06F 17/30144 |

(Continued)

*Primary Examiner* — Charles T Shedrick

(57) ABSTRACT

Systems, methods, and software are disclosed herein for handling incoming communications. In an implementation, a notification of an incoming communication is received. Duplicate indications of the incoming communication are avoided by determining whether an indication associated with an application will be surfaced. If not, then an indication of the incoming communication may be surfaced in association with another application. However, if the indication associated with the application will be surfaced, then the other notification associated with the other application may be suppressed.

20 Claims, 8 Drawing Sheets

(56) References Cited

U.S. PATENT DOCUMENTS

2017/0126609 A1\* 5/2017 Sharifi .................. G08B 5/222

\* cited by examiner

SUPPRESSING INDICATIONS OF INCOMING COMMUNICATIONS IN USER INTERFACES

RELATED APPLICATIONS

This application is a continuation of, and claims priority to, U.S. application Ser. No. 15/097,488, filed on Apr. 13, 2016, entitled "Suppressing Indications of Incoming Communications in User Interfaces," and which is hereby incorporated by reference in its entirety.

TECHNICAL BACKGROUND

It frequently occurs that two or more applications installed on a computing device provide the same or similar services. For example, a user may install two or more phone calling applications, multiple email applications, or any of a variety of applications that provide overlapping capabilities.

When the user is logged into multiple applications under the same user account, it may also occur that the applications ring, alert, or otherwise surface duplicate indications of an incoming communication. From the perspective of the user experience, the duplicate indications may be annoying to the user, such as when two different email applications each surface their own indication that the same email was received.

From a more technical perspective, the duplicate indications may waste processing resources and valuable screen space. Race conditions may exist whereby multiple applications are racing to access capabilities of the user interface. For instance, two phone calling applications may compete to issue an audible ring or compete to surface a visible indication of the incoming call on a display. The competing applications may create a jarring user experience and may also waste the underlying resources of their shared environment.

Overview

Technology is disclosed herein that mitigates the occurrence of multiple applications providing duplicate indications of an incoming communication. In an implementation, a notification of an incoming communication is received. Duplicate indications of the incoming communication are avoided by determining whether an indication associated with an application will be surfaced. If not, then an indication of the incoming communication may be surfaced in association with another application. However, if the indication associated with the application will be surfaced, then the other notification associated with the other application may be suppressed.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
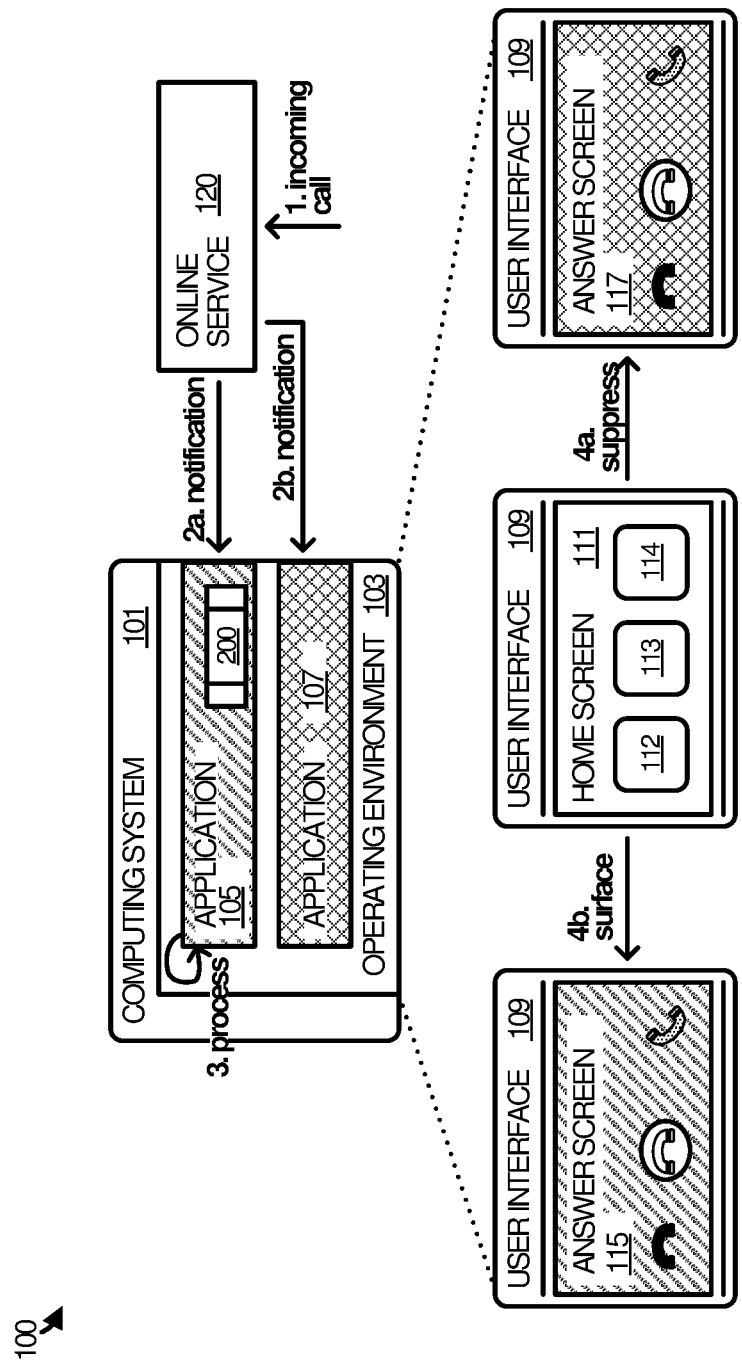
FIG. 1 illustrates an operational scenario related to suppressing indications of incoming communication in an implementation.

Technology is disclosed herein for mitigating the occurrence of duplicate indications of an incoming communication when the same user account is signed-in to multiple applications. In addition to improving the user experience by reducing or removing the occurrence of duplicate rings, for example, such technology may also have the technical effect of improving application and device performance by removing redundancies that would otherwise consume operational resources (processing load, battery life, etc.).

In an implementation, two applications may reside on a computing device that share at least some functionality in common and that allow a user to sign into a service under the same user account. As an example, two or more applications may execute that support phone calls (voice, video, or both). In another example, two or more applications may execute that support email, instant message, photo sharing, or any other service. In either example, the applications may be natively installed applications, applications that run in the context of a browser, or any variation or combination thereof.

In these situations, it may occur that a user is signed-in to multiple applications simultaneously under the same account. When this occurs, the online service associated with the applications may notify each of the applications when an incoming communication is received. For instance, a phone calling service may send a notification to one application when an incoming call is received, while also sending another notification to another application in regards to the incoming call. In another example, an email service may send one instance of an incoming email to one application and another instance of the same email to another application, assuming the user is signed-in under the same account to both.

Rather than allow both phone calling applications to ring, or to allow both email applications to surface alerts, technology disclosed herein suppresses the indication that may have been surfaced by one application in favor of the indication provided by the other-assuming the other application will be able to handle the incoming application.

More specifically, once an application receives a notification of an incoming communication, the application first ascertains whether or not a related application will be able to surface a related indication of the communication. If the related application will be able to surface the related indication of the communication, then the application refrains from surfacing its own indication, or "suppresses" its own indication. If the application ascertains that a related indication will not be surfaced by the related application, then the application proceeds to surface its own indication of the incoming communication.

In the phone call example from above, the first application checks with the related application to determine whether or not the related application will ring and/or surface an answer screen. If so, then the application refrains from ringing and refrains from surfacing its own answer screen. If the related application is not going to respond to the notification, then the application proceeds to ring and/or surface its own answer screen.

In the email example from above, the first application checks with the related application to determine whether or not the related application will surface a message that alerts the user to the presence of the new email. If so, then the application refrains from surfacing its own message. If the related application is not going to respond to the notification, then the application proceeds to surfaces its own message alerting the user to the new email that recently arrived.

Such technology may be especially beneficial when one application is a light-weight version of another application, which itself may be considered a "full" application. The light-weight application may provide fewer features and less functionality than the full application, but may be able to load faster, consume fewer resources than the full application, and generally perform more reliably than the full application.

When such circumstances prevail, one alternative solution to the problem of duplicate rings and alerts would be to always default to the light-weight application by disabling rings and/or alerts on the full application. However, such a solution would prevent the user from accessing all of the features and functionality of the full application, especially when handling real-time communications that are difficult to transfer between applications, such as phone calls. Instead, the present solution allows the light-weight application to defer to the full application when appropriate—when the full application is able to surface its own indication of an incoming call, email, or other such communication.

FIG. 1 illustrates an operational scenario 100 in an implementation to better describe various aspects of the proposed technology. Operational scenario 100 involves computing system 101. Computing system 101 provides an operating environment 103 in which application 105 and application 107 may run.

Figure 8:
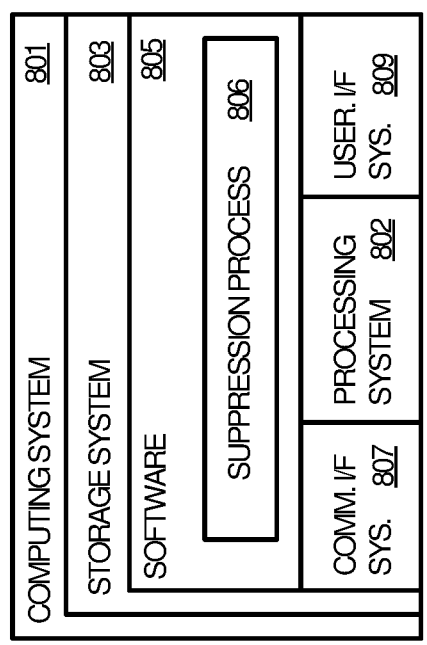
FIG. 8 illustrates a computing system suitable for implementing the enhanced communication handling technology disclosed herein, including any of the applications, architectures, elements, processes, and operational scenarios and sequences illustrated in the Figures and discussed below in the Technical Disclosure.

Computing system 101 is representative of any physical or virtual computing system capable of running applications, of which computing system 801 in FIG. 8 is representative. Examples include, but are not limited to, mobile phones, tablet computers, laptop computers, notebook computers, hybrid form-factor devices, desktop computers, smart home or office appliances, wearable devices, and any other suitable device, variation, or combination thereof.

Application 105 and application 107 are each representative of any application that may run on computing system 101 and communicate with online service 120. Application 105 and application 107 may each be natively installed applications, desktop application, mobile application, browser-based applications, or any variation or combination thereof. Examples include, but are not limited to, phone calling applications (voice, video, or both), email applications, instant messaging applications, photo sharing applications, cloud storage applications, and any variation of combination thereof.

Online service 120 is representative of any service remote from computing system 101 that may communicate with application 105 and application 107 in the context of providing a service. Examples include phone calling services (e.g. Skype®), email services, instant messaging services, photo sharing services, cloud storage services, and any variation or combination thereof. Online service 120 may be a stand-alone service or may be provided in the context of other services, such as a social network service or cloud productivity service.

In operational scenario 100, online service 120 receives an incoming communication. In this example, the incoming communication is a phone call, although other examples include emails, instant messages, and the like.

Online service 120 sends independent notifications to both application 105 and application 107 as, from the perspective of online service 120, each application appears as an independent node to the service. In other words, the service may not be aware that the applications are running on the same device.

Figure 2:
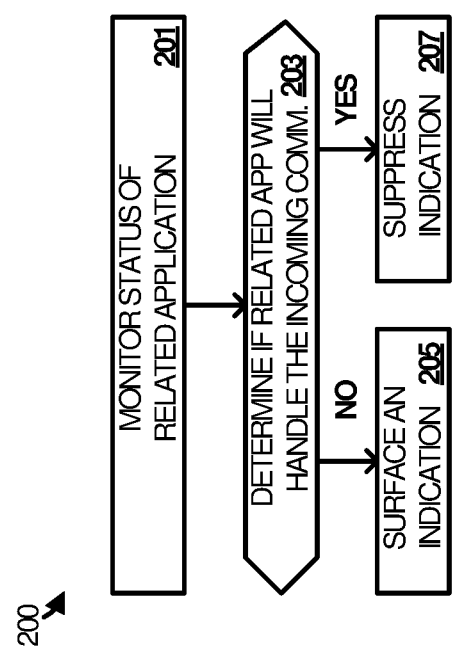
FIG. 2 illustrates a suppression process in an implementation.

Application 105 receives its notification and employs suppression process 200 in the context of operational scenario 100. The following discussion makes parenthetical reference to the steps illustrated in FIG. 2 with respect to suppression process 200.

In operation, application 105 monitors the status of application 107 (step 201). This may include querying application 107 for status information, either periodically, in response to receiving incoming notifications, or on some other basis. In other instances, application 105 may query operating environment 103 for status information pertaining to application 107, either periodically, in response to notifications, or on some other basis.

Application 105 determines from the status information if application 107 will respond to its separate notification, either by ringing, surfacing an answer screen, surfacing an alert message, or the like (step 205). If so, then application 105 suppresses its own indication of the incoming event. If application 107 will be silent in regards to the incoming event, then application 105 surfaces an indication (step 205).

For example, application 105 may learn from the monitoring step that a related application is not installed, is not active, or is otherwise not present on a device, in which case application 105 may conclude that the application will not handle a notification. In another example, application 105 may learn from the monitoring step that a different user account is logged into application 107 than the user account logged into application 105. Application 105 may again conclude from such information that application 107 will not respond to the notification (and in fact would not have received one). In yet another example, application 105 may learn from the monitoring step that application 107 has not surfaced an indication in a certain amount of time, and may conclude as a result to surface its own indication of the incoming communication.

Operational scenario 100 provides an example of how application 105 may respond to the notification provided by online service 120. User interface 109 is representative of a user interface that computing system 101 may render in association with operating environment 103. Home screen 111 is displayed in user interface 109 and includes various icons (icon 112, icon 113, and icon 114) that may be associated with various application available on the device.

Other screens in place of or in addition to home screen 111 are possible and may be considered within the scope of the present disclosure.

In a first option, application 107 surfaces answer screen 117 in user interface 109, in response to the notification received from online service 120. Answer screen 117 provides various controls for a user to answer and participate on a phone call using application 107, for example. This outcome occurs when application 105 determines to suppress its own answer screen.

In contrast, application 105 surfaces answer screen 115 in response to determining that application 107 will not be able to surface its own answer screen. Answer screen 115 also provides various controls for answering and participating in a phone call, albeit via application 105 instead of application 107.

Figure 3:
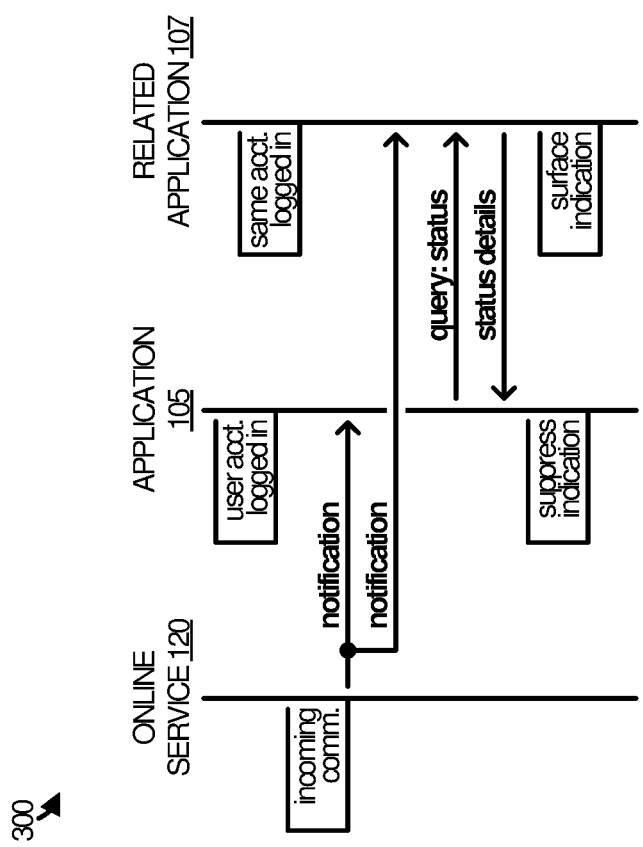
FIG. 3 illustrates an operational sequence in an implementation.

FIG. 3 illustrates an operational sequence 300 in an implementation. In operation, a user may be logged into application 105 and application 107 under the same account. In some cases, the user may have explicitly logged into each account. In other cases, the user may be automatically logged into one or the other (or both) applications or by some other mechanism.

Online service 120 receives an incoming communication for the user, for which it communicates individual notifications to each of application 105 and application 107. One notification is sent to application 105, while another is sent to application 107.

Application 105 responsively queries related application 107 for its status, such as the identity of the account presently logged into application 107. Application 107 responds with status details that application 105 can parse.

In this case, application 105 determines from the status details that the same user account is logged into application 107 as is logged into application 105. Accordingly, application 105 may conclude that application 107 will surface an indication of the incoming communication and may suppress its own indication as a result.

Figure 4:
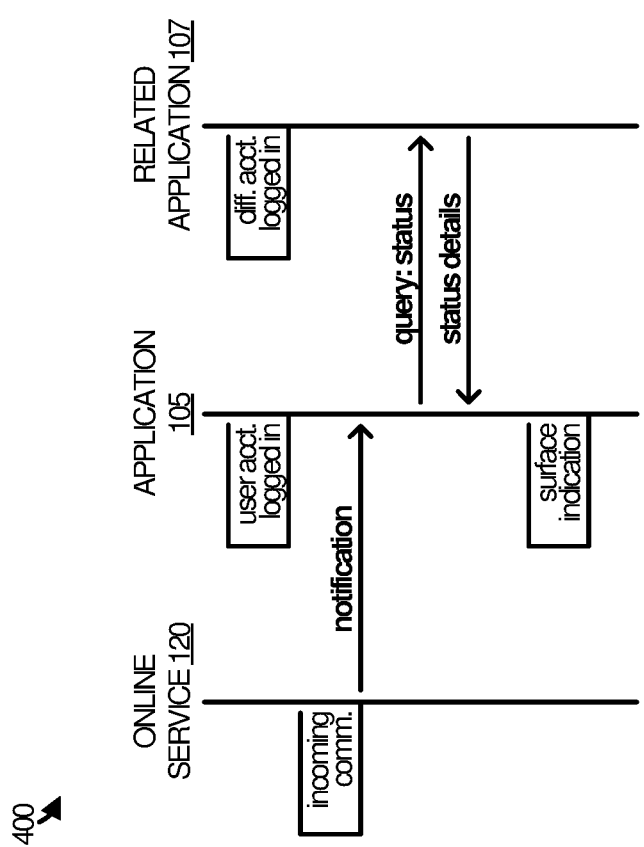
FIG. 4 illustrates an operational sequence in an implementation.

FIG. 4 illustrates another operational sequence 400 in an implementation. In operation, a user is logged into application 105 under one account, but is logged into application 107 under a different account. Online service 120 receives an incoming communication for the user account logged into application 105 and sends a notification regarding the same.

Application 105 receives the notification and responsively queries related application 107 for its status, such as the identity of the account presently logged into application 107. Application 107 responds with status details, which application 105 parses to determine that a different user account is logged into application 107. Accordingly, application 105 need not suppress its indication of the incoming communication, as application 107 will not surface its own application.

Figure 5:
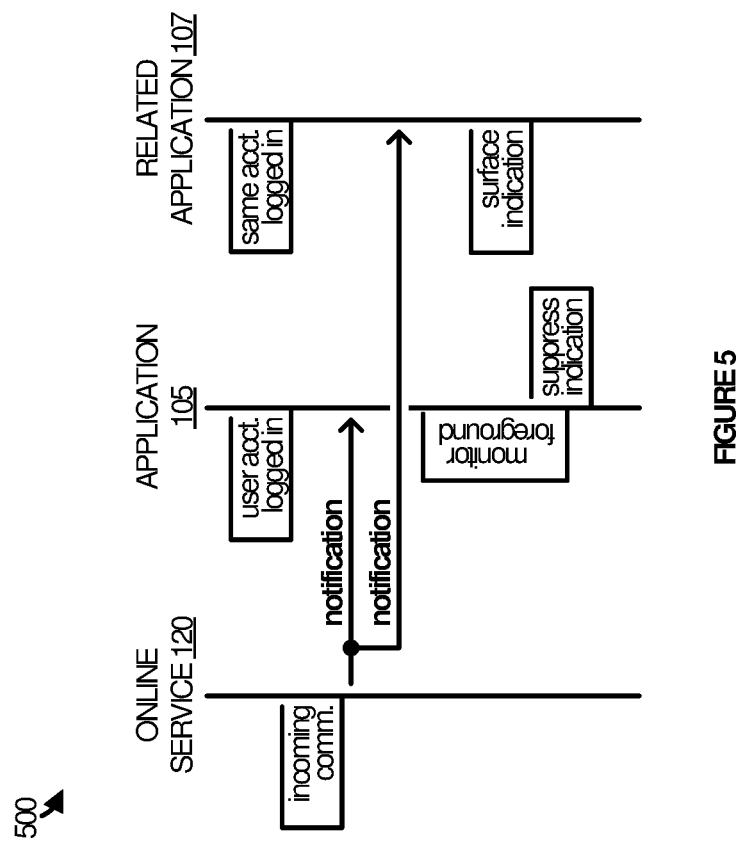
FIG. 5 illustrates an operational sequence in an implementation.

FIG. 5 illustrates an operational sequence 500 in another implementation. In operation, a user is logged into application 105 and application 107 under the same account. In some cases, the user may explicitly log into each account. In other cases, the user may be automatically logged into one or the other (or both) applications.

Online service 120 receives an incoming communication for the user, for which it communicates individual notifications to each of application 105 and application 107. One notification is sent to application 105, while another is sent to application 107.

Application 105 responsively begins to monitor for application 107 to ring, display an answer screen, surface an alert, or otherwise provide an indication of the incoming communication. Monitoring application 107 may include checking the foreground of operating environment 103 for when application 107 is in the foreground (or its screens). Application 105 may monitor for a set period of time, at the expiration of which it may decide to suppress or surface its own indication of the incoming communication depending on whether application 107 is able to respond or not. In this example, application 107 surfaces its answer screen in the foreground and application 105 refrains from surfacing its answer screen accordingly.

Figure 6:
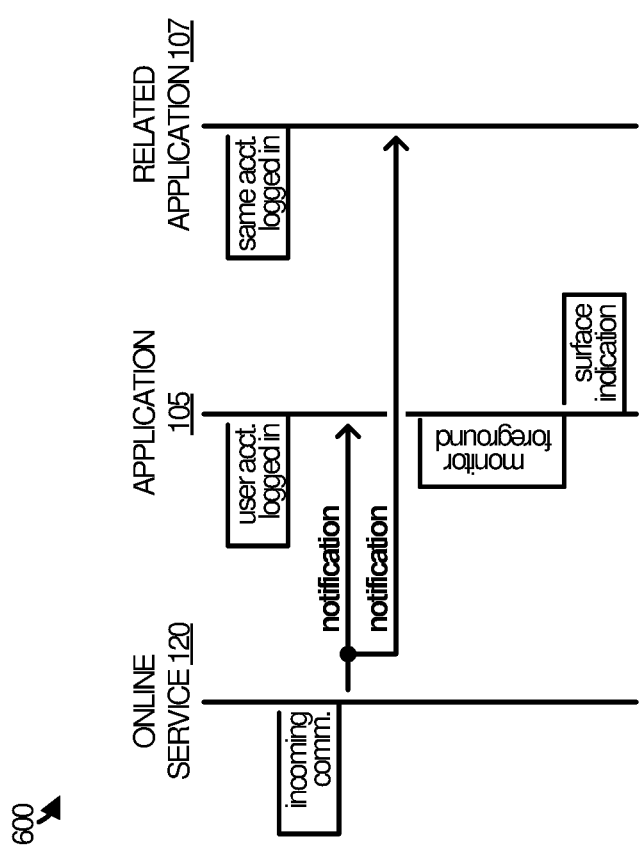
FIG. 6 illustrates an operational sequence in an implementation.

In FIG. 6 and operational sequence 600, a user is again logged into application 105 and application 107 under the same account. Online service 120 receives an incoming communication for the user, for which it communicates individual notifications to each of application 105 and application 107. One notification is sent to application 105, while another is sent to application 107.

Application 105 responsively begins to monitor for application 107 to ring, display an answer screen, surface an alert, or otherwise provide an indication of the incoming communication. Monitoring application 107 may include checking the foreground of operating environment 103 for when application 107 is in the foreground (or its screens). Application 105 may monitor for a set period of time, at the expiration of which it may decide to suppress or surface its own indication of the incoming communication depending on whether application 107 is able to respond or not. In this example, application 107 fails to surface anything in the foreground, possibly due to having crashed, come awake slowly, or otherwise failed. Accordingly, application 105 surfaces its own answer screen in the foreground at the end of the monitoring period.

Figure 7:
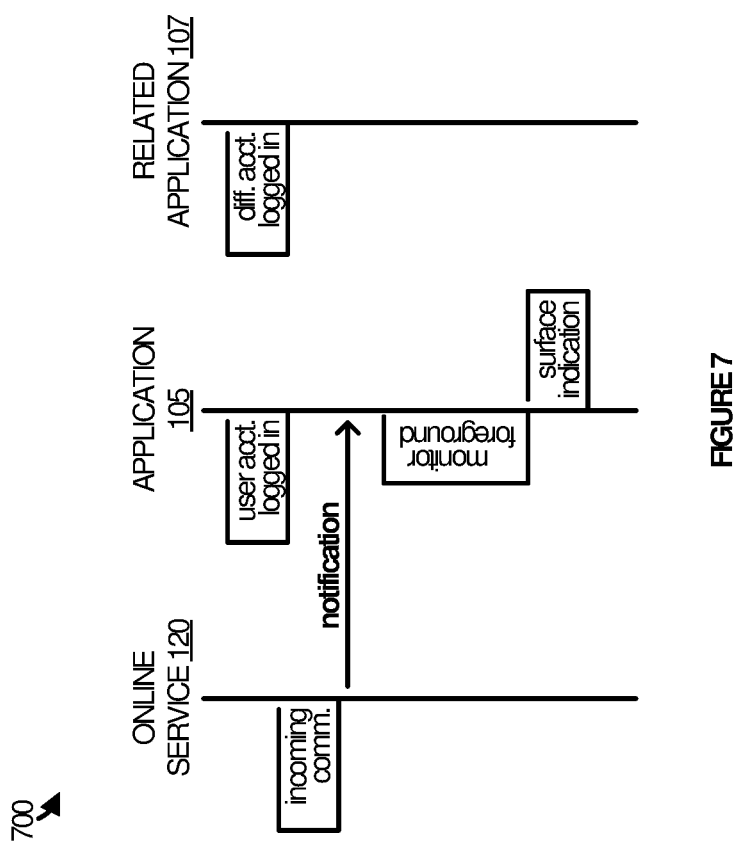
FIG. 7 illustrates an operational sequence in an implementation.

As shown in operational sequence 700 in FIG. 7, application 105 may still proceed to monitor for application 107 to display in the foreground, even if a different user account is logged into application 107 than application 105. This is because in some implementations application 105 may have no knowledge of which user account is logged into application 107. Rather, it may rely on monitoring the foreground of operational environment 103.

In such implementations, it may occur that application 107 receives a notification related to a different incoming communication by coincidence. For instance, a phone call may be received to the other account or an email may arrive in the inbox of the other account while application 105 is monitoring the foreground. Thus, application 105 may detect a false-positive were application 107 to surface an indication of the new communication in the foreground. To mitigate such a situation, application 105 could compare the details of any indication surfaced by application 107 to check that the indication relates to the same communication that was the subject of the notification received by application 105.

In one specific operational example, Skype® for Android® is an example of one application that may have a light-weight counterpart, which in this case is referred to as Talk. Talk needs to know if Skype is currently logged in and with which account. If Talk and Skype are logged in under the same account, then both applications will try to handle incoming calls, which may result in a race condition.

In an advance, Skype may include a capability to notify other applications (e.g. Talk) of the account that is currently logged into it and when a user signs out. This allows Talk to track when Skype is logged-in, or not, so as to suppress its own incoming calls when Skype is active and logged-in under the same account as Talk.

Talk obtains such information via broadcasts sent from Skype to Talk. Sending broadcasts is protected by permission, which is declared by Skype. Thus, Skype may limit its broadcasts to only those receiving applications that have the same developer signature as Skype.

When Talk queries Skype for its current logged in status, the name of Skype is packaged in an intent statement, which ensures that only Skype receives the query (which is also a broadcast) and responds. Talk may query Skype upon a log-in event to Talk. Talk may also query Skype periodically (e.g. every four hours).

The queries may specify an action (e.g. get account information) and parameters of a response, such as a Boolean true/false response with response to a logged-in status and an account name (skypeName) if logged in. Skype may respond by broadcasting its status to Talk upon a log-in event, in which case it expresses to Talk that it is logged-in (true/false) and under which account (skypeName). Skype may also broadcast its status to Talk upon a log-out event.

FIG. 8 illustrates computing system 801, which is representative of any system or collection of systems in which the various applications, services, scenarios, and processes disclosed herein may be implemented. Examples of computing system 801 include, but are not limited to, smart phones, laptop computers, tablet computers, desktop computers, hybrid computers, gaming machines, virtual reality devices, smart televisions, smart watches and other wearable devices, as well as any variation or combination thereof. Other examples, may include server computers, rack servers, web servers, cloud computing platforms, and data center equipment, as well as any other type of physical or virtual server machine, container, and any variation or combination thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes suppression process 806 which is representative of the processes discussed with respect to the preceding FIGS. 1-7, including suppression process 200. When executed by processing system 802 to enhance the handling of incoming communications, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions for implementing enhanced handling of incoming communications.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include suppression process 806. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to enhance call handling operations. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

EXAMPLE 1

A computing apparatus comprising: one or more computer readable storage media; a processing system operatively coupled with the one or more computer readable storage media; and an application stored on the one or more computer readable storage media and comprising program instructions that, when read and executed by the processing system, direct the processing system to at least: receive a notification of an incoming communication for which a related application may have also received a related notification of the incoming communication; prior to surfacing an indication of the incoming communication in a user interface, ascertain whether or not the related application will surface a related indication; suppress the indication in response to ascertaining that the related application will surface the related indication; and surface the indication in response to ascertaining that the related application will not surface the related application.

EXAMPLE 2

The computing apparatus of Example 1 wherein to ascertain whether or not the related application will surface the related indication, the program instructions direct the processing system to determine whether or not a user account logged into the application is also logged into the related application.

EXAMPLE 3

The computing apparatus of Examples 1-2 wherein to determine whether or not the user account logged into the application is also logged into the related application, the program instructions direct the processing system to listen for a broadcast message by the related application to the application informing the application of the user account presently logged into the related application.

EXAMPLE 4

The computing apparatus of Examples 1-3 wherein to ascertain whether or not the related application will surface the related indication, the program instructions further direct the processing system to determine whether or not the related application is installed.

EXAMPLE 5

The computing apparatus of Examples 1-4 wherein to ascertain whether or not the related application will surface the related indication, the program instructions direct the processing system to monitor for the related indication to surface in the user interface for a period of time after receiving the notification and, at an expiration of the period of time, conclude that the related application will not surface the related indication.

EXAMPLE 6

The computing apparatus of Examples 1-5 wherein to monitor for the related indication to surface in the user interface, the program instructions direct the processing system to monitor for when the related application is present in a foreground an operating environment in which both the application and the related application run.

EXAMPLE 7

The computing apparatus of Examples 1-6 wherein the application comprises a communication application, wherein the related application comprises a related communication application, and wherein the incoming communication comprises a phone call.

EXAMPLE 8

The computing apparatus of Examples 1-7 wherein the application comprises an email application, wherein the related application comprises a related email application, and wherein the incoming communication comprises an email.

EXAMPLE 9

A method of operating an application to manage incoming notifications, the method comprising: in the application, receiving a notification of an incoming communication for which a related application may have also received a related notification of the incoming communication; prior to surfacing an indication of the incoming communication in a user interface, in the application ascertaining whether or not the related application will surface a related indication; in the application, refraining from surfacing the indication in response to ascertaining that the related application will surface the related indication; and in the application, surfacing the indication in response to ascertaining that the related application will not surface the related application.

EXAMPLE 10

The method of Examples 9 wherein ascertaining whether or not the related application will surface the related indication comprises determining whether or not a user account logged into the application is also logged into the related application.

EXAMPLE 11

The method of Examples 9-10 wherein determining whether or not the user account logged into the application is also logged into the related application comprises listening for a broadcast message sent by the related application to the application informing the application of the user account presently logged into the related application.

EXAMPLE 12

The method of Examples 9-11 wherein ascertaining whether or not the related application will surface the related indication comprises determining whether or not the related application is installed.

EXAMPLE 13

The method of Examples 9-12 wherein ascertaining whether or not the related application will surface the related indication comprises monitoring for the related indication to surface in the user interface for a period of time after receiving the notification and, at an expiration of the period of time, concluding that the related application will not surface the related indication.

EXAMPLE 14

The method of Examples 9-13 monitoring for the related indication to surface in the user interface comprises monitoring for when the related application is present in a foreground an operating environment in which both the application and the related application run.

EXAMPLE 15

The method of Examples 9-14 wherein the application comprises a communication application, wherein the related application comprises a related communication application, and wherein the incoming communication comprises a phone call.

EXAMPLE 16

The method of Examples 9-15 wherein the application comprises an email application, wherein the related application comprises a related email application, and wherein the incoming communication comprises an email.

EXAMPLE 17

A computing apparatus comprising: one or more computer readable storage media; an application stored on the one or more computer readable storage media and comprising program instructions that, when read and executed by a processing system, direct the processing system to at least: receive a notification of an incoming communication for which a related application may have also received a related notification of the incoming communication; prior to surfacing an indication of the incoming communication in a user interface, ascertain whether or not the related application will surface a related indication; suppress the indication in response to ascertaining that the related application will surface the related indication; and surface the indication in response to ascertaining that the related application will not surface the related application.

EXAMPLE 18

The computing apparatus of Example 17 wherein to ascertain whether or not the related application will surface the related indication, the program instructions direct the processing system to determine whether or not a user account logged into the application is also logged into the related application.

EXAMPLE 19

The computing apparatus of Examples 17-18 wherein to determine whether or not the user account logged into the application is also logged into the related application, the program instructions direct the processing system to listen for a broadcast message by the related application to the application informing the application of the user account presently logged into the related application.

EXAMPLE 20

The computing apparatus of Examples 17-19 wherein to ascertain whether or not the related application will surface the related indication, the program instructions direct the processing system to monitor for the related indication to surface in the user interface for a period of time after receiving the notification and, at an expiration of the period of time, conclude that the related application will not surface the related indication.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
   one or more computer readable storage media;
   a processing system operatively coupled with the one or more computer readable storage media; and
   program instructions stored on the one or more computer readable storage media to prevent duplicate indications of incoming communications that, when read and executed by the processing system, direct the computing apparatus to at least:
   receive a notification from a service of an incoming communication associated with at least a first application executed by the processing system and a second application executed by the processing system, wherein both the first application and the second application are configured to invoke indications in response to the incoming communication;
   determine whether a first indication of the incoming communication, associated with the first application, will surface in a user interface;
   refrain from surfacing in the user interface a second indication of the incoming communication in response to determining that the first indication associated with the first application will surface in the user interface, wherein the second indication is associated with the second application; and
   surface the second indication in the user interface in response to determining that the first indication associated with the first application will not surface in the user interface.

2. The computing apparatus of claim 1 wherein to determine whether the first indication associated with the first application will surface, the program instructions direct the processing system to determine whether a user account logged into the first application is also logged into the second application.

3. The computing apparatus of claim 2 wherein to determine whether the user account logged into the first application is also logged into the second application, the program instructions direct the processing system to listen for a broadcast message by the first application indicative of the user account presently logged into the first application.

4. The computing apparatus of claim 3 wherein to determine whether the first indication associated with the first application will surface, the program instructions further direct the processing system to determine whether the first application is installed.

5. The computing apparatus of claim 1 wherein to determine whether the first indication associated with the first application will surface, the program instructions direct the processing system to monitor for the first indication to surface in the user interface for a period of time after having received the notification and, at an expiration of the period of time, conclude that the first indication will not surface.

6. The computing apparatus of claim 5 wherein to monitor for the first indication to surface in the user interface, the program instructions direct the processing system to monitor for when the first application is present in a foreground of an operating environment in which both the first application and the second application run.

7. The computing apparatus of claim 1 wherein the first application comprises a first communication application, wherein the second application comprises a second communication application, and wherein the incoming communication comprises an incoming voice call.

8. The computing apparatus of claim 1 wherein the first application comprises a first email application, wherein the second application comprises a second email application, and wherein the incoming communication comprises an email.

9. A method for preventing duplicate indications of incoming communications, the method comprising:
   receiving a notification from a service of an incoming communication associated with at least a first application executed by the processing system and a second application executed by the processing system, wherein both the first application and the second application are configured to invoke indications in response to the incoming communication;
   determining whether a first indication of the incoming communication, associated with the first application, will surface in a user interface;
   refraining from surfacing in the user interface a second indication of the incoming communication in response to determining that the first indication associated with the first application will surface in the user interface, wherein the second indication is associated with the second application; and
   surfacing the second indication in the user interface in response to determining that the indication associated with the first application will not surface in the user interface.

10. The method of claim 9 wherein determining whether the first indication associated with the first application will surface comprises determining whether a user account logged into the first application is also logged into the second application.

11. The method of claim 10 wherein determining whether the user account logged into the first application is also logged into the second application comprises listening for a broadcast message by the first application indicative of the user account presently logged into the first application.

12. The method of claim 11 wherein to determining whether first indication associated with the first application will surface comprises determining whether the first application is installed.

13. The method of claim 9 wherein determining whether the indication associated with the first application will surface comprises monitoring for the first indication to surface in the user interface for an amount of time after having received the notification and, at an expiration of the amount of time, determining that the first indication associated with the first application will not surface.

14. The method of claim 13 wherein monitoring for the first indication to surface in the user interface comprises monitoring for when the first application is present in a foreground of an operating environment in which both the first application and the second application run.

15. The method of claim 9 wherein the first application comprises a first communication application, wherein the second application comprises a second communication application, and wherein the incoming communication comprises an incoming voice call.

16. The method of claim 9 wherein the first application comprises a first email application, wherein the second application comprises a second email application, and wherein the incoming communication comprises an email.

17. A computing device comprising:
a communication interface configured to receive a notification from a service of an incoming communication associated with at least a first application on the computing device and a second application on the computing device, wherein both the first application and the second application are configured to invoke indications in response to the incoming communication;
a processing system operatively coupled with the communication interface and configured to at least:
determine whether the first application will surface in a user interface a first indication of the incoming communication, associated with the first application;
determine to refrain from surfacing in the user interface a second indication of the incoming communication in response to determining that the first application will surface the first indication, wherein the second indication is associated with the second application; and
determine to surface in the user interface the second indication in response to determining that the first application will not surface the first indication.

18. The computing device of claim 17 wherein to determine whether the first application will surface the first indication, the processing system is configured to determine whether a user account logged into the first application is also logged into the second application.

19. The computing device of claim 18 wherein to determine whether the user account logged into the first application is also logged into the second application, the processing system is configured to listen for a broadcast message by the first application indicative of the user account presently logged into the first application.

20. The computing device of claim 17 wherein to determine whether the first application will surface the first indication, the processing system is configured to monitor for the first indication to surface in the user interface for a period of time after having received the notification and, at an expiration of the period of time, conclude that the first application will not surface the first indication.

* * * * *